US008242887B2

(12) United States Patent
Cornwall et al.

(10) Patent No.: US 8,242,887 B2
(45) Date of Patent: Aug. 14, 2012

(54) ENDPOINT CLASSIFICATION AND COMMAND PROCESSING

(75) Inventors: Mark K. Cornwall, Spokane, WA (US); Matthew Johnson, Spokane, WA (US); Barry Cahill-O'Brien, Spokane, WA (US)

(73) Assignee: Itron, Inc., Liberty Lake, WA (US)

( * ) Notice: Subject to any disclaimer, the term of this patent is extended or adjusted under 35 U.S.C. 154(b) by 457 days.

(21) Appl. No.: 12/603,043

(22) Filed: Oct. 21, 2009

(65) Prior Publication Data

US 2010/0265096 A1 Oct. 21, 2010

Related U.S. Application Data

(63) Continuation of application No. 12/362,457, filed on Apr. 20, 2009.

(51) Int. Cl.
*G06F 12/00* (2006.01)

(52) U.S. Cl. .................................................... 340/9.14

(58) Field of Classification Search .................. 340/9.14
See application file for complete search history.

(56) References Cited

U.S. PATENT DOCUMENTS

2007/0183330 A1* 8/2007 Salt .............................. 370/235
2009/0140880 A1* 6/2009 Flen et al. ................ 340/870.02
2010/0188260 A1* 7/2010 Cornwall et al. ........ 340/870.02

* cited by examiner

*Primary Examiner* — Adi Amrany
(74) *Attorney, Agent, or Firm* — Dority & Manning, P.A.

(57) ABSTRACT

Packet formats and related infrastructure for improved messaging and processing of commands in an AMR system are disclosed. In one embodiment, a method for identifying the features of an endpoint based on data encoded in a standard meter reading is provided. In this regard, the method includes receiving a standard meter reading having an endpoint type and subtype classification, wherein the subtype classification corresponds to a feature of the endpoint that may be reconfigured. Once received, the standard metering reading is decoded. Then, the method identifies the classification of the endpoint with regard to type and subtype and determines whether the endpoint is capable of implementing a particular command.

8 Claims, 5 Drawing Sheets

100
UTILITY SERVICE PROVIDER
HOST COMPUTING SYSTEM
112
110
114
WIDE AREA NETWORK
106
COLLECTION SYSTEM
HANDHELD READER
120
CCU
124
MOBILE COLLECTION UNIT
122
REPEATER
126
102
UM

300

| FIELD # | BYTES | VALUE | DESCRIPTION |
| --- | --- | --- | --- |
| 1 | 2 | 16A3 | Frame Sync 314 |
| 2 | 1 | 1E | Protocol ID 316 |
| 3 | 1 | 1C | Endpoint Type/subtype |
| 4 | 4 | xxxxxxxx | Endpoint Serial Number 306 |
| 5 | 4 | xxxxxxxx | Current Consumption 308 |
| 6 | 1 | xx | Tilt Count |
| 7 | 1 | xx | Tamper Count 312 |
| 8 | 2 | xxxx | Packet CRC 310 |

ENDPOINT CLASSIFICATION AND COMMAND PROCESSING

PRIORITY CLAIM

This application claims the benefit of previously filed U.S. Patent Application of the same title, assigned U.S. Ser. No. 12/362,457, filed Jan. 29, 2009, and amended on or about Apr. 20, 2009, which application is incorporated herein by reference for all purposes.

BACKGROUND

Historically the meter readings that measure consumption of utility resources such as water, gas, or electricity has been accomplished manually by human meter readers at the customers' premises. The relatively recent advances in this area include collection of data by telephone lines, radio transmission, walk-by, or drive-by reading systems using radio communications between the meters and the meter reading devices. Although some of these methods require close physical proximity to the meters, they have become more desirable than the manual reading and recording of the consumption levels. Over the last few years, there has been a concerted effort to automate meter reading through the implementation of devices and messaging systems that allow data to flow from the meter to a host computer system without human intervention. These systems are referred to in the art as Automated Meter Reading (AMR) systems.

In an AMR system, an Encoder Receiver Transmitter ("ERT") may be implemented within a utility meter in order to encode and transmit data utilizing radio-based communications. The ERT is a meter interface device attached to the meter, which either periodically transmits utility consumption data ("bubble-up" ERTs) or receives a "wake up" polling signal containing a request for their meter information from a collector (e.g., a fixed transceiver unit, a transceiver mounted in a passing vehicle, a handheld unit, etc.).

Transmissions of meter readings from an ERT are typically encoded as "packetized" data. In the present application, the term "packet" is intended to encompass packets, frames, cells or any other method used to encapsulate data for transmission between remote devices. As understood in the art, packets typically maintain a plurality of fields as well as a preamble and trailer to identify the beginning and end of the packet. In this regard, existing packet formats and related systems typically include at least one field that identifies the category of utility meter (gas, water, electricity etc.) that is reporting a meter reading. However, these aspects of meter messaging systems have not developed in ways to account for the expanded functionality and diversity in the types of ERTs in use. For example, while existing meter messaging systems identify ERT ("endpoint") type, endpoints are not readily classified based on their ability to satisfy particular commands. A utility service provider may not be able to readily determine all of the capabilities of a particular endpoint from data in a meter reading. The enhanced services desired by customers and utility service providers will only continue to increase the diversity in the types of endpoints being installed in AMR systems. The limitations in existing meter messaging systems may limit continued development of these enhanced services.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Packet formats and related infrastructure for improved messaging and processing of commands in an AMR system are disclosed. In one embodiment, a method for identifying the features of an endpoint based on data encoded in a standard meter reading is provided. In this regard, the method includes receiving a standard meter reading having an endpoint type and subtype classification, wherein the subtype classification corresponds to a feature of the endpoint that may be re-configured. Once received, the standard metering reading is decoded. Then, the method identifies the classification of the endpoint with regard to type and subtype and determines whether the endpoint is capable of implementing a particular command.

DESCRIPTION OF THE DRAWINGS

The foregoing aspects and many of the attendant advantages of the disclosed subject matter will become more readily appreciated as the same become better understood by reference to the following detailed description, when taken in conjunction with the accompanying drawings, wherein:

FIG. 3 is a block diagram illustrating a packet format suitable for illustrating aspects of the disclosed subject matter;

DETAILED DESCRIPTION

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. In this regard, the following disclosure first provides a general description of a meter reading system in which the disclosed subject matter may be implemented. Then, an exemplary routine for identifying the capabilities of an endpoint based on data encapsulated in a standard meter reading will be described. The illustrative examples provided herein are not intended to be exhaustive or to limit the invention to the precise forms disclosed. Similarly, any steps described herein may be interchangeable with other steps, or combinations of steps, in order to achieve the same or substantially similar result.

Figure 1:
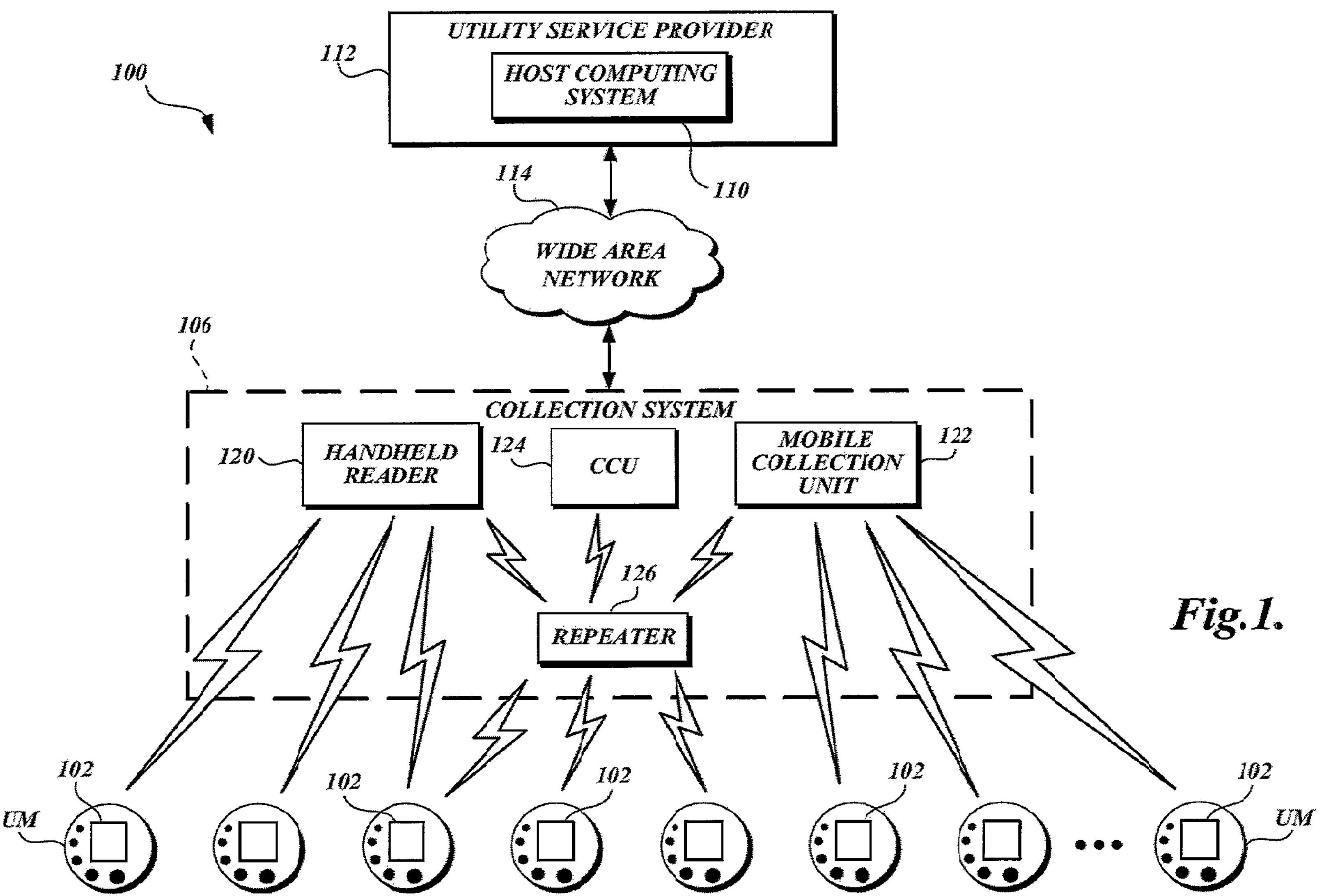
FIG. 1 is a block diagram depicting an illustrative meter reading system formed in accordance with an embodiment of the disclosed subject matter.

Referring now to FIG. 1, the following is intended to provide a general description of one embodiment of a communications system, such as a meter reading system 100, in which aspects of the present disclosure may be implemented. In one embodiment, the meter reading system 100 may be an automated meter reading (AMR) system that reads and monitors endpoints remotely, typically using a collection system comprised of fixed collection units, mobile collection units, etc.

Generally described, the meter reading system 100 depicted in FIG. 1 includes a plurality of endpoint devices 102, a collection system 106, and a host computing system 110. The endpoint devices 102 are associated with, for example, utility meters UM (e.g., gas meters, water meters, electric meters, etc.), for obtaining data, such as meter data (e.g., consumption data, tampering data, etc.) therefrom. The endpoint devices 102 in the meter reading system 100 may be a wired or wireless communications device capable of performing two-way communications with the collection system 106 utilizing AMR protocols. For example, the endpoint devices 102 are capable of receiving data (e.g., messages, commands, etc.) from the collection system 106 and transmitting meter data or other information to the collection system 106. Depending on the exact configuration and types of devices used, the endpoint devices 102 transmit standard meter readings either periodically ("bubble-up"), in response to a wake-up signal, or in a combination/hybrid configuration. In each instance, the endpoint devices 102 are configured to exchange data with devices of the collection system 106.

Still referring to FIG. 1, the collection system 106 of the meter reading system 100 collects meter reading data and other data from the plurality of endpoint devices 102, processes the data, and forwards the data to the host computing system 110 of the utility service provider 112. The collection system 106 may employ any number of AMR protocols and devices to communicate with the endpoint devices 102. In the embodiment shown, the collection system 106, for example, may include a handheld meter reader 120 capable of radio-based collection and/or manual entry of meter readings. As illustrated, the collection system 106 may also include a mobile collection unit 122 (e.g., utility vehicle), configured with a radio transmitter/receiver for collecting meter readings within a drive-by coverage area. In addition, the collection system 106, may also include, for example, a fixed network comprised of one or more Cell Control Units 124 ("CCU 124") that collect radio-based meter readings within a particular geographic area. Each of the meter reading devices 120-124 may collect either directly from the endpoint devices 102, or indirectly via one or more optional repeaters 126. Collectively, the meter reading devices included in the collection system 106 will be referred to hereinafter as a "collector." In this regard, those skilled in the art and others will recognize that other types of collectors then those illustrated in FIG. 1 may be used to implement aspects of the disclosed subject matter. Accordingly, the specific types of devices illustrated should be construed as exemplary.

In the embodiment depicted in FIG. 1, the collection system 106 is configured to forward meter readings to the host computing system 110 of the utility service provider 112 over a wide area network 114, which may be implemented utilizing TCP/IP Protocols (e.g., Internet), GPRS or other cellular-based protocols, Ethernet, WiFi, Broadband Over Power Line, and combinations thereof, etc. In one aspect, the collection system 106 serves as the bridge for transmitting data between devices that utilize AMR protocols (e.g., the endpoint devices 102) with computers (e.g., the host computing system 110) coupled to the wide area network 114. As mentioned previously, collectors are configured to receive meter reading data (e.g., packets) from one or more endpoints 102. The received data is parsed and re-packaged into a structured format suitable for transmission over the wide area network 114 to the host computing system 110. In this regard, meter reading data may be aggregated in a data store maintained at the host computing system 110. Accordingly, the host computing system 110 includes application logic for reading, processing, and managing the collection of meter data.

The discussion provided above with reference to FIG. 1 is intended as a brief, general description of one meter reading system 100 capable of implementing various features of the present disclosure. While the description above is made with reference to particular devices linked together through different interfaces, those skilled in the art will appreciate that the claimed subject matter may be implemented in other contexts. In this regard, the claimed subject matter may be practiced using different types of devices and communication interfaces than those illustrated in FIG. 1.

Figure 2:
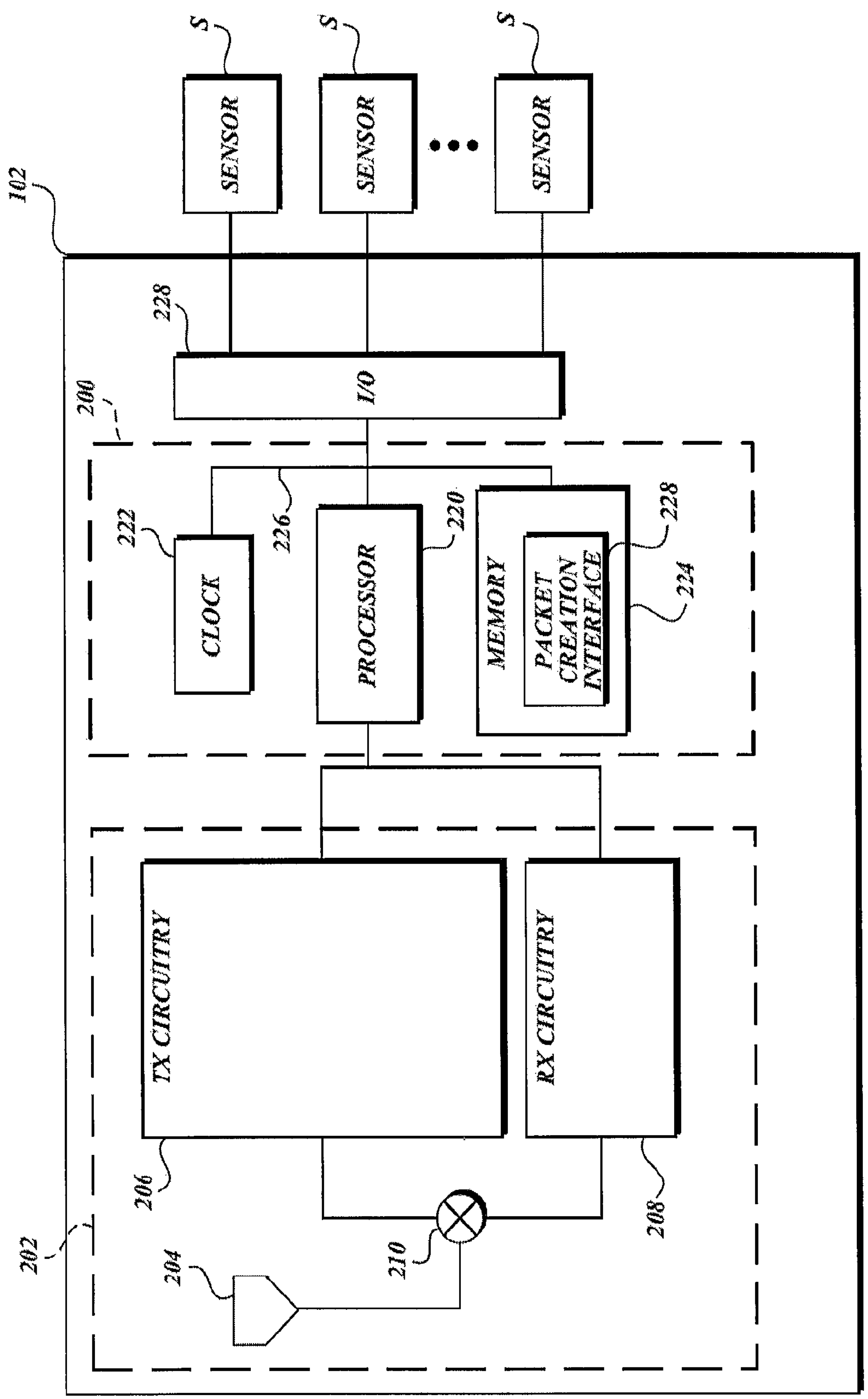
FIG. 2 is a block diagram depicting components of one example of an endpoint device formed in accordance with an embodiment of the disclosed subject matter.

Turning now to FIG. 2, there is shown one example architecture of an endpoint device 102 for use in the meter reading system 100. Each endpoint device 102 continuously gathers and stores meter data from the associated sensors of the utility meters. Upon request or periodically (e.g., every 30 seconds) the endpoint device 102 retrieves the stored data, formats and/or encodes the data according to one or more metering protocols, and transmits this data with other information via radio frequency (RF) communication links to a collector. The endpoint device 102 is also capable of receiving data from a collector, or other RF-based communications devices.

For carrying out the functionality described herein, the endpoint device 102 comprises a main computing device 200 communicatively coupled to a communications device 202. In the example depicted in FIG. 2, the communications device 202 is a radio-based transceiver, transmitter-receiver, or the like, that may include a communications antenna 204, transmit (TX) circuitry 206 and receive (RX) circuitry 208, and an antenna multiplexer 210 that switches between the transmit (TX) circuitry 206 and the receive (RX) circuitry 208 depending on the mode of operation. The communications device may be configured to transmit RF-based communications signals according to any suitable modulation protocols, such as DSSS, FHSS, FM, AM, etc. The transmit circuitry and/or receive circuitry may be implemented as an RF integrated circuit (RFIC) chip, and may comprise various components including, for example, mixers, a voltage controlled oscillator (VCO), a frequency synthesizer, automatic gain control (AGC), passive and/or active filters, such as harmonic filters, dielectric filters, SAW filters, etc, A/D and/or D/A converters, modulators/demodulators, PLLs, upconverters/downconverters, and/or other analog or digital components that process baseband signals, RF signals, or IF band signals, etc.

In one embodiment, the endpoint device 102 transmits data over a preselected set of frequency channels in a predefined frequency band ("operational frequency band") using frequency hopping spread spectrum (FHSS) techniques. For example, in one embodiment, the endpoint device 102 may operate over a preselected set of 80 channels approximately 200 KHz in width. One example of such a frequency band is the 902-918 MHz portion of the ISM frequency band, although other portions of the ISM or other radio frequency bands may be used. The operational frequency band may be contiguous (e.g., 902-918 MHZ) or non-contiguous (e.g., 902-908 and 916-924 MHz). In this embodiment, the endpoint device 102 may frequency hop between channels in the entire operational frequency band or may frequency hop between a subset of channels (e.g., fifty (50) channels) in the operational frequency band. In any event, standard meter readings containing a default set of data may be transmitted as a frequency-hopping spread-spectrum (FHSS) signal at a frequency and time selected in accordance with a frequency hopping table. For example, in one embodiment, using a frequency hopping table, the endpoint device 102 will periodically transmit a FHSS signal having a standard meter reading using a programmed subset of fifty (50) frequency channels.

As briefly discussed above, the communication of RF-based communications signals by the endpoint devices 102 is carried out under control of the main computing device 200. In the example depicted in FIG. 2, the main computing device 200 may include a processor 220, a timing clock 222, and a memory 224, connected by a communication bus 226. As further depicted in FIG. 2, the main computing device 200 may also include an I/O interface 228 for interfacing with, for example, one or more sensors S associated with a utility meter. The one or more sensors S may be any known sensor for obtaining consumption data, tampering data, etc. The data obtained from the sensors S is processed by the processor 220 and then stored in the memory 224.

The memory 224 depicted in FIG. 2 is one example of computer-readable media suited to store data and program modules for implementing aspects of the claimed subject matter. As used herein, the term "computer-readable media" includes volatile and non-volatile and removable and non-removable memory implemented in any method or technology capable of storing information, such as computer-readable instructions, data structures, program modules, or other data. In this regard, the memory 224 depicted in FIG. 2 is one example of computer-readable media but other types of computer-readable media may be used.

Those skilled in the art and others will recognize that the processor 220 serves as the computational center of the endpoint device 102 by supporting the execution of instructions that are available from the memory 224. Accordingly, the processor 220 executes instructions for managing the overall system timing and supervision of the endpoint device 102 including accumulating and storing sensor data, providing data to be transmitted, as well as selecting the time and frequency channel the data will be transmitted/received. In this regard, instructions executed by the processor 220 effectuates the formatting and encoding of the meter data and other data in any standard format or protocol.

In one embodiment, a packet format and associated metering infrastructure are provided that minimize the quantity of data transmitted from the endpoint 102 when reporting meter readings. Upon request or periodically (e.g., every 30 seconds) the endpoint 102 may transmit a standard meter reading containing a default set of data. To conserve resources, the endpoint 102 may be configured to only supply power to the transmitter circuitry 206 as needed. By reducing the size or amount of data transmitted, the amount of time that power is supplied to the transmitter circuitry 206 is also minimized. Accordingly, providing a highly compact packet format to report standard meter reading will reduce the total power consumed and effectively extend the operational life of the endpoint.

Now with reference to FIG. 3, a packet format well-suited for reporting a standard meter reading will be described. In the embodiment depicted in FIG. 3, the packet 300 includes a plurality of rows ("fields") having entries organized within the BYTES 302, VALUE 304, and DESCRIPTION 306 columns. In this embodiment, the BYTES 302 column includes entries containing integers that identify the amount of data allocated to a particular field. The VALUE 304 column includes entries that identify a fixed or variable value for the data within the field of the packet 300. Similarly, the DESCRIPTION 306 column includes a string of characters that provides a human-readable description of the field.

In accordance with one embodiment, the packet 300 provides a highly compact format for encapsulating a standard meter reading. The packet 300 depicted in FIG. 3 utilizes a total fixed length of 136 bits in encapsulated data. In particular, the packet 300 includes a fixed length 32-bit consumption field 308 suitable for providing the relevant data while minimizing packet size. An expanded 16-bit cyclical redundancy check field 310 is provided to improve the detection rates for identifying corrupt packets. In addition, a lengthened tamper field 312 is provided that enables improved tamper identification. As described in further detail below, the protocol ID field 314 and endpoint type/subtype field 316, allow the implementation of improved mechanisms for identifying the features of a particular endpoint. Those skilled in the art and others will recognize that certain attributes of the packet 300 illustrated in FIG. 3 are only illustrative. In this regard, entries within the fields of the packet 300 may be added/removed or otherwise modified in alternative embodiments. Accordingly, the packet 300 is only representative one embodiment of how a standard meter reading may be encapsulated for transmission from the endpoint 102.

Returning to endpoint 102 depicted in FIG. 2, the memory 224 includes a packet creation interface 228 having instructions suitable for being executed by the processor 220 to implement aspects of the present disclosure. In one embodiment, the packet creation interface 228 implements a method operative to collect packet data for transmission from the endpoint 102 in a standard meter reading. For example, the packet creation interface 228 may be used to collect data in preparation of encoding the packet 300 (FIG. 3). When called, the packet creation interface 228 may receive two parameters that identify a current consumption value and a pointer referencing a buffer memory space that will be used to store packet data. Upon receiving the call, an existing buffer memory space having a partial set of data that includes a protocol ID value corresponding to a process for decoding the packet and a type/subtype value for classifying one or more features of the endpoint is accepted. Then, the packet creation interface 228 retrieves one or more data items for temporary storage in the buffer memory space. In one embodiment, the one or more data items include a serial number that uniquely identifies the endpoint. Upon storing the one or more data items in the buffer memory space, the packet creation interface 228 returns the pointer to the buffer memory space. In this way, data is collected on the endpoint in preparation of encoding the packet 300 for transmission to a remote device.

Now with reference to FIG. 4, one example component architecture for a collector 400 will be described. As mentioned previously with reference to FIG. 1, the collector 400 may be a handheld meter reader, a mobile collection unit (e.g., utility vehicle), a CCU, etc. Generally described, the collector 400 includes a processor 402, a memory 404, and a clock 406 interconnected via one or more buses 408. In addition, the collector 400 includes a network interface 410 comprising components for communicating with other devices over the wide area network 114 (FIG. 1), utilizing any appropriate protocol, such as TCP/IP Protocols (e.g., Internet), GPRS or other cellular-based protocols, Ethernet, WiFi, Broadband Over Power Line, and combinations thereof, etc. As further depicted in FIG. 4, the collector 400 includes a radio-based communication device 412 for transmitting/receiving wireless communications with other radio-based devices (e.g., the endpoint devices 102).

Figure 4:
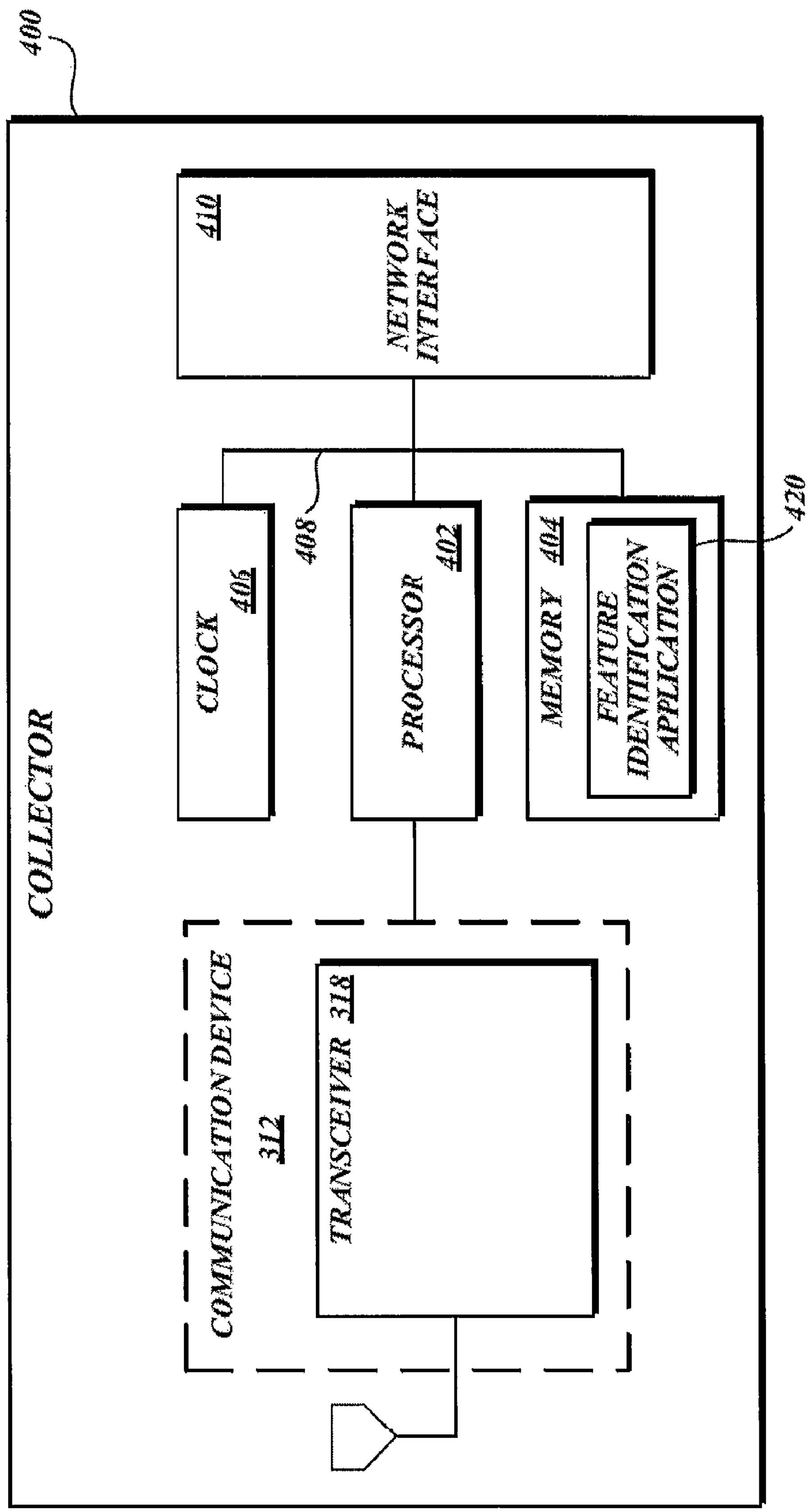
FIG. 4 is a block diagram depicting components of one example of a collector formed in accordance with an embodiment of the disclosed subject matter.

In the embodiment shown in FIG. 4, the communication device 412 includes at least one transceiver, transmitter-receiver, or the like, generally designated 418, of half-duplex (transmit or receive but not both simultaneously) or fullduplex design (transmit and receive simultaneously) that is capable of identifying, locating, and tracking FHSS signals transmitted by the endpoint devices 102. In one embodiment, the radio-based communications device 412 has the ability to measure the signal strength level and/or noise/interference level of all channels across the endpoints' operating frequency band. The communication device 412 examines the entire portion of the operational frequency band employed by the endpoint devices 102, to identify a signal suggestive of a standard meter reading. In addition or alternatively, the collector 400 can send a "wake-up" message in order to establish communication with the endpoint device 102.

In the embodiment depicted in FIG. 4, the memory 404 includes a feature identification application 420 having instructions suitable for being executed by the processor 402 to implement aspects of the present disclosure. The collector 400 is configured to receive meter reading data (e.g., packets) from different types of endpoints. In this regard, some endpoints may be configured to accept and respond to received commands. For example the collector may issue and transmit a command to re-program the channels on which the endpoint transmits meter readings, request particular types and/or intervals of consumption data, modify network configuration information and/or the packet format in which data is encapsulated for network transmission, etc. In one embodiment, the feature identification application 420 identifies the features of an endpoint based on data provided in a standard meter reading. By identifying these features, determinations may be readily made regarding whether an endpoint can implement a particular command.

Now, with reference to FIG. 5, a feature identification routine 500 that identifies the capabilities of an endpoint device from data in a standard meter reading will be described. As mentioned previously, a collector may receive meter readings from various types of devices. In one embodiment, the feature identification routine 500 decodes and analyzes packet data to identify the features of the endpoint that is reporting a meter readings. As a result, a collector or other device can readily identify whether the endpoint is capable of implementing a particular type of command. While the feature identification routine 500 is described herein as being performed on a device that collects a meter reading (i.e., a collector), those skilled in the art and others will recognize that the routine 500, or a portion thereof, may be implemented on other types of devices.

Figure 5:
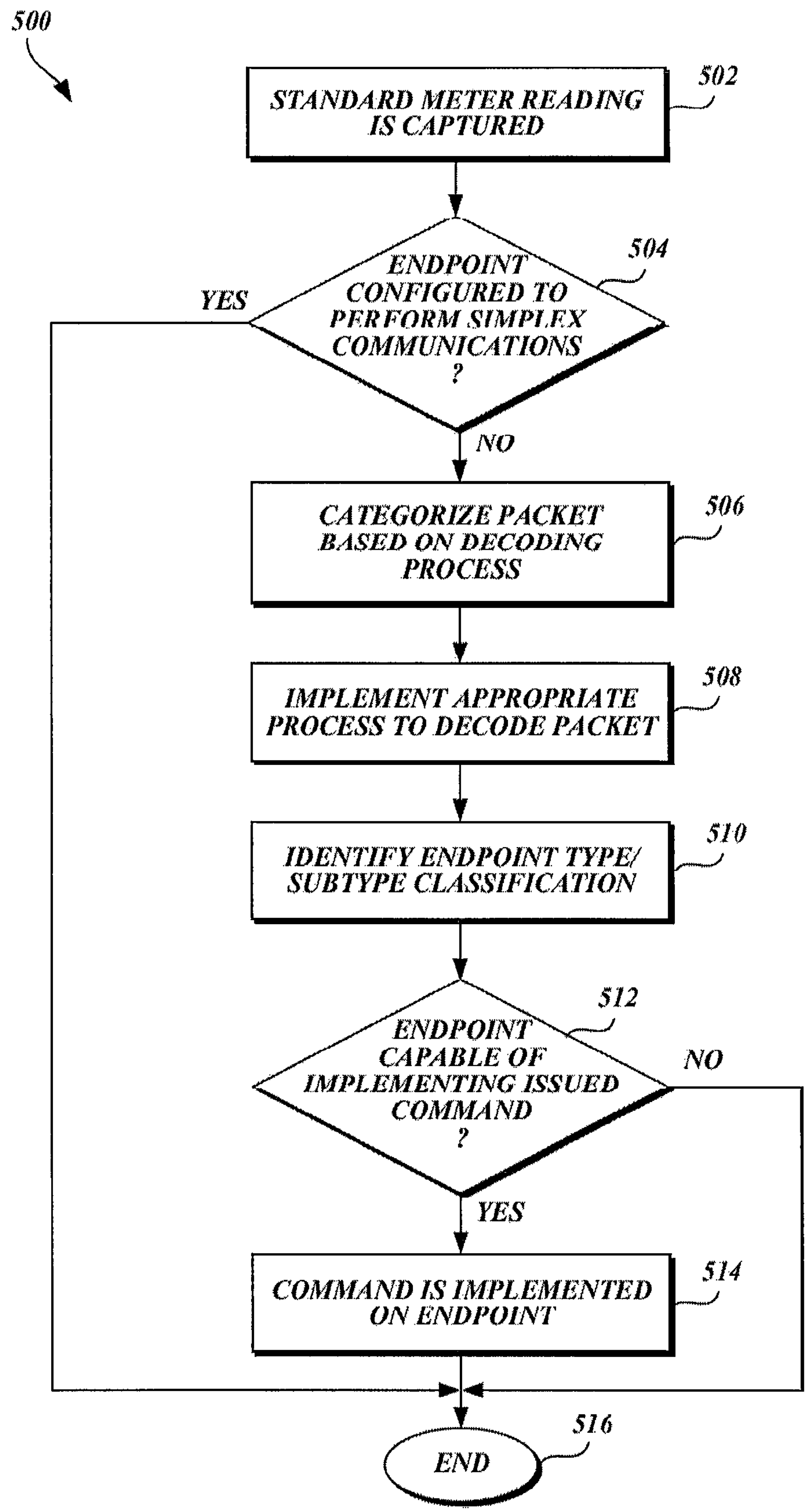
FIG. 5 is a flow diagram of one example feature identification routine formed in accordance with an embodiment of the disclosed subject matter.

As illustrated in FIG. 5, the feature identification routine 500 begins at block 502 where a standard meter reading containing a default set of data is captured. As mentioned previously, the collector 300 can generate and store a "snapshot" of the operational frequency band employed by the endpoint devices 102. In one embodiment, the collector 300 examines the operational frequency band employed by the endpoint devices 102 to identify and capture a signal containing a standard meter reading, at block 502.

At decision block 504 of the feature identification routine 500, a determination is made regarding whether the endpoint that is reporting a meter reading is limited to performing simplex communication. A collector provided by the disclosed subject matter is capable of reading and decoding packets from multiple types of endpoints, at least some of these endpoints may be legacy devices that are limited to performing simplex communications. In one embodiment, a data item in the preamble of the packet received at block 502 indicates whether the packet originated from one of the types of legacy devices. In this instance when the result of the test performed at block 504 is "yes," a command cannot be implemented on the endpoint and the feature identification routine 500 proceeds to block 516, where it terminates. Conversely, if the data item in the preamble indicates that the received packet was not generated by a legacy device, the result of the test performed at block 504 is "no" and the feature identification routine 500 proceeds to block 506.

At block 506, the packet containing the standard meter reading received at block 502 is categorized based on the method that will be used to decode the packet. It will be appreciated that endpoints may utilize any number of different packet formats in reporting metering reading data. In one embodiment, an enhanced format is provided that generically classifies a packet based on how the packet will be decoded. For example, the packet 300 described above with reference to FIG. 3 includes a protocol ID field 318 having a value that is read and used to categorize the incoming packet 506. In this regard, the value in the protocol ID field 316 corresponds to a set of attributes that affect how the packet will be decoded including but not limited to, whether the packet is of fixed or variable length, field size, redundancy checking and tampering attributes, and the like.

At block 508 of the feature identification routine 500, the incoming packet is decoded based on the categorization performed at block 506. As understood in the art, the specific process or algorithm used to decode a packet may depend on the structure and/or values of data being provided in the transmission. In this regard and by way of example only, decoding the packet at block 508 may include calculating error detection values, applying redundancy checks, verifying tamper counters, and the like. However, it should be understood that the process or algorithm used to decode the packet varies depending on how the packet is categorized at block 506. Accordingly, other and/or different processes may be performed at block 508 without departing from the scope of the claimed subject matter.

As illustrated in FIG. 5, the type/subtype categorization of the endpoint that generated an incoming packet is identified, at block 510. As mentioned previously, a collector may receive a meter reading from any number of devices, each having potentially different capabilities.

In one embodiment, the enhanced packet format provided by the disclosed subject matter is configured to better account for the increase in diversity of endpoint types. In the embodiment depicted in FIG. 3, the packet 300 includes a type/subtype field 306 which facilitates the use of a layered and more extensible schema in classifying endpoints. In existing AMR systems, packets used to report standard meter readings have typically maintained relatively small type fields (i.e., 4-bits). When a 4-bit type field is used, a total of sixteen (16) classifications of endpoints are available. In one embodiment, the exemplary packet 300 includes an 8-bit type/subtype field having 5-bits allocated for an endpoint type and 3-bits allocated for a corresponding endpoint subtype. Accordingly, a total of thirty-two (32) classifications are available for endpoint types with each type capable of being further classified within eight (8) subtypes. In one embodiment, the attributes of a particular endpoint, including the endpoints corresponding type/subtype, may be cached at the collector and/or host computing system.

At decision block 512, the feature identification routine 500 determines whether a particular endpoint is capable of implementing an issued command. As mentioned previously, data from a plurality of endpoints 102 may be aggregated in a data store maintained at the host computing system 110. This data may be analyzed for numerous purposes including detecting problems/malfunctions in meters, tuning network configuration attributes, and the like. Based on this or other processing, a command may be issued from the host computer system 110 and/or collector 300 to modify the current configuration of a particular endpoint.

In determining whether an endpoint is capable of implementing a particular command, at block 512, multi-layered processing of the endpoint types/subtype may be performed. By way of example, a command may be issued to “cut-off” the supply of a utility service, such as natural gas, at endpoints within a particular geographic area. In this instance, both the type and subtype associated an endpoint may be used in determining whether the command can be implemented. In particular, the value corresponding to the endpoint type may indicate that the endpoint is used to supply natural gas. However, each endpoint of this type may not be capable of performing an automatic “cut-off” to terminate utility services based on a received command. Accordingly, the subtype field can be used to further classify the features provided by the endpoint to, for example, specify whether the endpoint is capable of implementing an automatic “cut-off.”

Accordingly, a lookup to identify the classification of the endpoint with regard to type/subtype may be performed at block 512. If the result of the lookup indicates that the endpoint is capable of implementing an issued command, the result of the test performed at block 512 is “yes” and the feature identification routine 500 proceeds to block 514, described in further detail below. Conversely, if the lookup indicates that endpoint is not capable of implementing the issued command, the feature identification routine 500 proceeds to block 516, where it terminates. In this instance, utility service personnel may reconfigure the endpoint manually or take other action to implement the desired functionality.

At block 514 of the feature identification routine 500, a command that modifies the configuration of a particular endpoint is implemented. Upon determining that an endpoint is capable of implementing an issued command, a message containing command logic may be routed from the host computing system 110 to the endpoint 102 via the collector 300. In this regard, a received command may re-program the channels on which the endpoint 102 transmits meter readings, request particular types and/or intervals of consumption data, modify network configuration information and/or the packet format. However, all of the types of commands that may be satisfied at block 514 are not described in detail here. Once the command has been implemented, the feature identification routine 500 proceeds to block 516, where it terminates.

While embodiments of the claimed subject matter have been illustrated and described, it will be appreciated that various changes can be made therein without departing from the spirit and scope of the present disclosure.

The embodiments of the invention in which an exclusive or privilege is claimed are defined as follows:

1. A packet creation interface that implements a method operative to collect packet data for transmission from an endpoint in a standard meter reading, the method comprising:

receiving an interface call having parameters that identify a current consumption value and a pointer referencing a buffer memory space for temporary storage of packet data;

accepting an existing buffer memory space having a protocol ID value corresponding to a process for decoding the packet and a type/subtype value for classifying at least one feature of the endpoint;

retrieving one or more data items for temporary storage in the buffer memory space, the one or more data items including a serial number that uniquely identifies the endpoint; and returning the pointer to the buffer memory space.

2. An interface as in claim 1, wherein the protocol ID value is a fixed length field within the packet data for transmission.

3. An interface as in claim 1, wherein the type/subtype value is a fixed length field within the packet data for transmission.

4. An interface as in claim 3, wherein the type/subtype value fixed length field corresponds to one eight bit byte wherein five bits designate a type value and the remaining three bits designate a subtype value.

5. An interface as in claim 1, wherein the created packet has a fixed length.

6. An interface is in claim 5, wherein the created packet has a total fixed length of 136 bits.

7. An interface as in claim 1, wherein the created packet includes a 16-bit cyclical redundancy check field.

8. An interface as in claim 1, wherein said interface is implemented in software stored in a memory device associated with an endpoint usable in an automatic meter reading network.

* * * * *